United States Patent [19]

Tanaka et al.

[11] Patent Number: 5,130,411
[45] Date of Patent: Jul. 14, 1992

[54] TWO STAGE PROCESS FOR PREPARATION OF INCREASED MOLECULAR WEIGHT POLYARYLENE SULFIDES WITH WATER STAGE AND POOR SOLVENT STAGE

[75] Inventors: Shinji Tanaka; Hiroshi Inoue, both of Mie, Japan

[73] Assignee: Tosoh Corporation, Yamaguchi, Japan

[21] Appl. No.: 665,041

[22] Filed: Mar. 6, 1991

[30] Foreign Application Priority Data

Mar. 7, 1990 [JP] Japan .................................. 2-53712

[51] Int. Cl.$^5$ .............................................. C08G 75/14
[52] U.S. Cl. ...................................... 528/388; 528/86; 528/222; 528/224; 528/226; 528/391; 528/481; 528/494; 528/497; 528/498
[58] Field of Search ................. 528/388, 391, 86, 222, 528/224, 226, 481, 494, 497, 498

[56] References Cited

U.S. PATENT DOCUMENTS

| | | | |
|---|---|---|---|
| 4,645,826 | 2/1987 | Iizuka et al. | 528/388 |
| 4,732,967 | 3/1988 | Idel et al. | 528/388 |
| 4,794,161 | 12/1988 | Kato et al. | 528/388 |
| 4,900,808 | 2/1990 | Idel et al. | 528/388 |

*Primary Examiner*—Harold D. Anderson
*Attorney, Agent, or Firm*—Sughrue, Mion, Zinn, Macpeak & Seas

[57] ABSTRACT

An improved process for preparing increased molecular weight polyarylene sulfides is disclosed. The process comprises at least two stages: a first polymerization stage in which a polymer of a relatively low molecular weight is prepared and a second polymerization stage in which the molecular weight is substantially increased. The increased molecular weight permits the polymer to be used in a wide range of molding and shaping applications.

8 Claims, No Drawings

TWO STAGE PROCESS FOR PREPARATION OF INCREASED MOLECULAR WEIGHT POLYARYLENE SULFIDES WITH WATER STAGE AND POOR SOLVENT STAGE

BACKGROUND OF THE INVENTION

1. Field of the Invention

This invention relates to a process for preparing polyarylene sulfides and in particular to a process for preparing increased molecular weight polyarylene sulfides.

Polyarylene sulfides have excellent heat and chemical resistance properties and hence, have attracted a good deal of attention as materials useful for producing parts of electrical and electronic instruments, automative parts and the like. Polyarylene sulfides may be formed or molded into various molded parts, films, sheets, fibers and the like, for example, by injection or extrusion techniques. These formed or molded products have been used in applications where high heat and chemical resistance properties are required.

2. Prior Art

A typical method for production of polyarylene sulfides is known, for example, in Japanese Patent Publication (KOKOKU) No. 45-3368, which method comprises reacting a dihaloaromatic compound with an alkali metal sulfide such as sodium sulfide, in an organic amide solvent such as N-methyl pyrrolidone. However, polyarylene sulfide polymers have such a low molecular weight that they, as such, can not be successfully or satisfactorily employed in molding processes, such as an injection molding process. Therefore, it has been proposed to crosslink low molecular weight polyarylene sulfide by thermally oxidizing the material in air, thereby producing a polymer product of an increased molecular weight that may be used in molding and shaping applications. Nevertheless, certain difficulties have been experienced with the increased molecular weight polymers, when they are used in preparation of films, fibers and the like by extrusion techniques. The poor extrudability appears to be due to the occurrence of a significant level of crosslinking and branching in the polymers.

As another approach, it has been proposed to increase the molecular weight of polyarylene sulfide polymers by means of special polymerization techniques. A typical example of the polymerization processes for that purpose is disclosed in Japanese Patent Publication (KOKOKU) No. 52-12240, which is characterized by conducting the polymerization process in the presence of a polymerization aid RCOOM, wherein R is a hydrocarbyl group and M is an alkali metal. The thus resulting polymer products shown an excellent extrudability and are adaptable for use in production of films, fibers and the like. However, the process requires that the polymerization aid should be added in a molar proportion approximately equal to that of an alkali metal sulfide which is one of the reactants used in the process. If it is desired to further increase the molecular weight of the polymer, then an expensive aid such as lithium acetate or sodium benzoate should be used in an increased amount. This adds to the production cost of polyarylene sulfide and would be commercially disadvantageous. Furthermore, the process may present an environmental pollution problem, since the polymerization stage is followed by a product recovery stage from which an aqueous effluent containing organic acids and other substances is discharged. In order to prevent environmental pollution, the effluent must be subjected to a good deal of expensive treatments. Therefore, this approach is economically disadvantageous.

It has been also proposed to conduct a process for preparation of polyarylene sulfide in the presence of a large amount of deliberately added water, for example, in Japanese Patent Public Disclosure (KOKAI) No. 61-7332. However, the process requires a very prolonged reaction time and hence has low productivity. Further, since the boiling point of water is substantially lower than the temperature at which the polymerization can proceed, an exceedingly high pressure must be maintained in the reaction system. Furthermore, the considerably large specific heat of water consumes a great deal of energy in heating the reaction system up to the reaction temperature. The above-discussed productivity, reaction pressure and energy consumption problems lead to increased production costs thus making the process commercially disadvantageous.

BRIEF EXPLANATION OF THE INVENTION

An object of the invention is to provide a process for preparing polyarylene sulfides of a usefully increased molecular weight without using any conventional polymerization aid such as an organic carboxylate salt, or without the presence of a substantial amount of water in the reaction system.

A further object of the invention is to provide such a polymerization process that is freed from the problems or difficulties experienced with the known approaches.

Accordingly, the invention provides a process for preparing polyarylene sulfides by reacting an alkali metal sulfide and a dihaloaromatic compound in an organic amide solvent, characterized in that the process is conducted in at least the following two stages:

(A) a step wherein the process is carried out at a temperature of 180°–250° C. in the presence of 0.5–2.5 moles of water per mole of the alkali metal sulfide so as to produce a polyarylene sulfide having a melt viscosity of about 5–800 poises at a conversion of at least 50 mole % of the dihaloaromatic compound; and (B) a step wherein a poor solvent for the polyarylene sulfide is added to the reaction mixture to such an extent that the added poor solvent comprises 30–60% by weigh of the total of the solvents present and the process is further continued at a temperature raised to the range of 250°–290° C., thereby to form an increased molecular weight polyarylene sulfide product showing a melt viscosity greater than about 1,000 poises as measured at a temperature of 300° C. and a shear rate of 200 sec$^{-1}$.

DETAILED DESCRIPTION OF THE INVENTION

The invention will be described in detail.

Examples of the alkali metal sulfides which may be used in the invention include sulfides of sodium, lithium, potassium, rubidium and cesium and mixtures thereof. The alkali metal sulfide may be employed in hydrated form, or in dehydrated form, or as an aqueous mixture. Of the above-listed alkali metal sulfides, sodium sulfide is preferably used in the commercial practice, because of the cheapness thereof. The alkali metal sulfides may contain alkali metal bisulfides and thiosulfates in a small or trace proportion. These contaminants may be conveniently removed or converted into sulfides, if a small proportion of an alkali metal hydroxide is employed together with the contaminated sulfide materials.

Particular examples of the dihaloaromatic compounds which may be used in the present invention include p- and m-dichlorobenzenes, p- and m-dibromobenzenes, p- and m-diiodobenzenes, p,p'-dichlorodiphenyl, p,p'-dibromodiphenyl, p,p'-dichlorodiphenyl ether, p,p'-dichlorodiphenyl sulfone, p,p'-dichlorobenzophenone and the like. Especially, p- and m-dichlorobenzenes are preferred. Two or more of the dihaloaromatic compounds may be used in combinations. If desired, a small amount of monohaloaromatic compound or trihaloaromatic or other polyhaloaromatic compound may be used for controlling the molecular weight of the polymer derived from the abovementioned dihaloaromatic component.

As examples of the organic amide solvents used in the first step (A) of the present process, N-methyl-2-pyrrolidone, N-ethyl pyrrolidone, N-methyl caprolactam, tetramethyl urea and the like may be mentioned. Especially, N-methyl-2-pyrrolidone is preferred (this will be referred to as "NMP" hereinafter). Desirably, the polymerization solvent, organic amide, is an aprotic compound.

The poor solvent for the polyarylene sulfide product, which is added to the reaction system in the second step (B) of the present process is an agent that is effective for separating the polyarylene sulfide from the solution thereof in the polar organic solvent. The poor solvent that is to be used in the present process should meet the following requisites:

(1) it is soluble in the polar organic solvent that is employed in the process;
(2) it is not, in itself, a solvent for the polyarylene sulfide;
(3) it has boiling characteristics appropriate for the reaction conditions under which the process is carried out; and
(4) it is stable under the reaction conditions employed.

Any solvent satisfying the requisites may be conveniently used as a poor solvent in the process. Preferably, $C_8$-$C_{24}$ aromatic hydrocarbons and $C_6$-$C_{24}$ aliphatic hydrocarbons are used. Especially preferred examples include n-decane, p-cymene, trimethoxybenzene, cumene, methylsulfone, kerosine, n-tetradecane, mesitylene and the like.

The polymerization process according to the invention is conducted in at least two stages which are different from each other with respect to the quantity of poor solvent present in the reaction system and the reaction temperature. The expression "at least two stages" means that the present process may optionally comprise an ancillary step or steps before, after or between the specified two stages, provided the advantages intended to be achieved by the two stages themselves are ensured.

The process will be illustrated in further detail.

The First Stage (A)

In the first polymerization stage (A) of the present process, the dihaloaromatic compound and the alkali metal sulfide are reacted at a temperature of 180°-250° C. in the presence of 0.5-2.5 moles of water per mole of the alkali metal sulfide to such an extent that the dihaloaromatic compound is polymerized to a conversion exceeding 50 mole % so as to produce a polyarylene sulfide having a melt viscosity of about 5-800 poises.

In the operation of the first stage, the alkali metal sulfide and the dihaloaromatic compound are initially added to the organic amide solvent at a temperature ranging from ambient temperature to about 180° C., desirably under an inert gas atmosphere. The mixture is raised to a reaction temperature within the specified range and allowed to react. If the alkali metal sulfide used has a water content insufficient to meet the specified range of water content in the reaction system, then a supplementary amount of water is added to the mixture. On the other hand, if the reaction system contains water in excess of the specified range of water content, then any excess water may be expelled from the system by heating the solvent charged with the alkali metal sulfide to a temperature of 180°-210° C. prior to introduction of the dihaloaromatic reactant. The quantity of water which may be present in the reaction system ranges from 0.5 to 2.5 moles per mole of the alkali metal sulfide charged. In particular, the presence of 1.0-1.5 moles water per mole of the alkali metal sulfide tends to produce a polyarylene sulfide product having a desirably increased molecular weight. If the water content is less than 0.5 moles on the same basis, undesirable side reactions, such as degradation of the product polyarylene sulfide, tend to take place. If the water content is in excess of 2.5 moles, then undesirably the rate of polymerization reaction tends to be extremely reduced or degradation tends to proceed.

The first polymerization stage is carried out at a temperature of 180°-250° C. When a reaction temperature lower than 180° C. is employed, the reaction rate will become unacceptably lowered. If the reaction temperature is higher than 250° C., the product polyarylene sulfide is subjected to degradation thus resulting in production of a polymer having an unacceptably low melt viscosity.

Desirably, the quantity of dihaloaromatic compound used in the process is in the range of 0.9-1.1 moles, in particular 0.99-1.05 moles, per mole of the alkali metal sulfide, in order to achieve an acceptable increase in the molecular weight of polymer.

The end point of the first stage, i.e. the point of time when the polymerization should be transferred from the first stage to the subsequent stage, typically the second polymerization stage, is defined to be a point when a conversion of the dihaloaromatic compound has reached a level exceeding 50 mole %, preferably exceeding 98 mole %, in the first stage. If the conversion achieved in the first stage is less than 50 mole %, an extremely extended polymerization time will be required in the second polymerization stage.

The conversion of the dihaloaromatic compound referred to herein is calculated as follows:

(a) In the case where the dihaloaromatic compound (DH) is charged in an excess molar proportion with respect to the alkali metal sulfide:

$$\text{Conversion (\%)} = \frac{(\text{charged } DH - \text{residual } DH)}{(\text{charged } DH - \text{excess } DH)} \times 100$$

(b) In the case which does not fall under the above case (a):

$$\text{Conversion (\%)} = \frac{(\text{charged } DH - \text{residual } DH)}{\text{charged } DH} \times 100$$

When the polymerization is transferred from the first stage to the second stage, the polyarylene sulfide should have a melt viscosity of about 5-800 poises, preferably of 100-800 poises. If the melt viscosity is less than 5 poises upon completion of the first stage, an extremely extended polymerization time will be required. It has been found that it is practically impossible to produce a polymer having a melt viscosity of greater than about 800 poises with the conditions specified for the first stage.

The polymerization time used in the first stage ranges from 0.5 to 10 hours, preferably from 3 to 5 hours. The term "polymerization time" used with respect to the first stage means the period after the specified reaction temperature of 180°-250° C. has been attained.

The Second Stage (B)

In the second polymerization stage (B) of the present process, a poor solvent for polyarylene sulfide is added into the slurry from the first polymerization stage in a proportion of 30-60% by weight of the total of the solvents present in the reaction system. The mixture is then heated to a reaction temperature within the range of 250°-290° C. and the polymerization is allowed to again continue at this temperature. The second stage is conducted so that a melt viscosity of greater than 1,000 poises is imparted to the polyarylene sulfide through the further polymerization.

If the poor solvent is present in a proportion of less than 30% by weight of the total of solvents in the system, the polymer tends to be degraded or the molecular weight of polymer is not increased to an acceptable level. On the other hand, if the poor solvent is present in a proportion exceeding 70% by weight, again the molecular weight of polymer is not increased to a desirable level.

Where a polymerization temperature lower than 250° C. is employed in the second stage, the reaction rate is unacceptably low, resulting a low productivity. A polymerization temperature exceeding 290° C. will cause the product polymer to degrade.

In the second stage, if desired, a small amount of a stabilizing agent, such as an alkali metal hydroxide or carbonate or the like, may be added to stabilize the reaction system.

Obviously from the foregoing, the second stage of the present process is conducted for significantly increasing the melt viscosity of the polyarylene sulfide product from the preceeding first stage, rather than for merely fractionating and granulating with polymer from the first stage. That is to say, the molecular weight of polymer should be further increased through the second stage.

Thus, a polymerization time of 0.5-20 hours, preferably 3-7 hours is employed in the second stage. The term "polymerization time" used with respect to the second stage means the period after the specified reaction temperature of 250°-290° C. has been attained.

When the polymerization is transferred from the first stage to the second stage, the slurry produced in the first stage may be passed to a separate reactor vessel in which the second stage is then effected under appropriate conditions. Alternatively, the first and second stages may be carried out in the same reactor vessel by suitably adjusting the polymerization conditions.

The poor solvent may be added after the first stage polymerization has been completed, and before or during the temperature is raised to the second stage polymerization temperature or when the polymerization temperature has been just attained.

The polyarylene sulfide product according to the present process has a melt viscosity of greater than about 1,000 poises, preferably greater than 2,000 poises, as measured at a temperature of 300° C. and a shear rate of 200 sec$^{-1}$. The melt viscosity may be determined by a standard method using a KOHKA-type flow tester with a die having a diameter of 0.5 mm and a length of 2 mm.

The product polymer of the present process may be recovered by any conventional technique. For example, when the second stage polymerization has been completed, the resulting slurry is cooled and, with or without being diluted, for example, by water, then filtered. The filter cake is repeatedly washed with water and filtered to give a purified polyarylene sulfide product.

Because the polyarylene sulfides prepared in accordance with the present process have a high melt viscosity of greater than about 1,000 poises and have a substantially linear structure, they may be formed without difficulty into tough films, sheets, fibers and the like. Further, the polyarylene sulfides of the present invention may be injection molded or extruded or rotary molded into various moldings or shapes. Even if the molded or shaped products have a thick part or parts, the part or parts are highly resistant to cracking.

The product polymers of the invention may be filled with a powder filler such as carbon black, calcium carbonate, silica titanium oxide or the like; or a fibrous filler such as carbon fiber, glass fiber, asbestos, polyaramide fiber and the like.

The product polymers of the invention may be used as a blend with one or more other resins, such as polycarbonate, polyphenylene oxide, polysulfone, polyarylene, polyacetal, polyimide, polyamide, polyester, polystyrene, ABS and the like.

EXAMPLES

The invention will be disclosed in more detail with reference to the following Examples which are presented only for illustrative purpose and impose no restrictions on the scope of the invention.

EXAMPLE 1

Pre-polymerization

An autoclave of a 0.5-l capacity was charged 110 ml of NMP and 79.28 g of sodium sulfide penta-hydrate. The contents were slowly heated up to 205° C. over a period of 2 hours with stirring, while distilling 32.3 g of water out the autoclave. It was found that the proportion of water remaining in the reaction system was about 1.08 moles per mole of the sodium sulfide.

After cooling down to 140° C., 66.2 g of p-dichlorobenzene (DCB) and 40 ml of NMP were introduced into the reactor. The mixture was heated to 250° C. and allowed to polymerize for 3 hours at 250° C. so as to give a pre-polymerized slurry at a conversion of 99.1%.

From a sample of the resulting slurry, a polymer product was recovered, which showed a melt viscosity of 52 poises as measured at 300° C. and a shear rate of 200 sec$^{-1}$ in a KOHKA-type flow tester.

Post-polymerization

After completion of the preceding pre-polymerization, the autoclave was charged with 70 g of n-decane that comprised 32% by weight of the total of the solvents present. Then the contents of the autoclave were heated to 250° C. and allowed to polymerize for 5 hours. The pressure during the polymerization was about 9 kg.cm$^{-2}$. The resulting polymer was recovered as small particles. The conversion of DCB was 99.7%. The polymer showed a melt viscosity of 1,600 poises as measured by the above-defined method.

EXAMPLES 2–11

Pre-polymerization

An autoclave of a 15-l capacity was charged with 5 l of NMP and heated to 120° C. Then, 1,866 g of sodium sulfide 2.8-hydrate was introduced. The mixture was slowly heated to 205° C. over a period of about 2 hours with stirring, while distilling 405 g of water out the autoclave. It was found that the proportion of water remaining in the reaction system was about 1.24 moles per mole of the sodium sulfide.

After cooling down to 140° C., the autoclave was charged with 2,090 g of DCB. The mixture was heated to 225° C. and allowed to polymerize for 2 hours and subsequently heated up to 250° C. and allowed to polymerized for a further period of 3 hours so as to give a pre-polymerized slurry, referred to as "R-1" hereinafter, at a conversion of 99.7%. It was found that the resulting polymer had a melt viscosity of 730 poises.

Post-polymerization

In each of Examples 2–6, a 120.3 g portion of the slurry synthesized in the pre-polymerization, R-1, was charged into an autoclave of a 0.5-l capacity. The autoclave was charged with a quantity of n-decane varying from 32% to 52% by weight of the total of solvents. Then the mixture was post-polymerized at 250° C. for 5 hours.

On the other hand, in Examples 7–11, the post-polymerization was conducted at 250° C. or 265° C. with 44% by weight of n-decane added, for a period varying from 3 to 8 hours.

The recovered polymers were in the form varying from powder to particles depending upon the extent of stirring (r.p.m.) employed in the respective post-polymerization procedures. However, in all the cases, the polymers showed increased melt viscosities regardless of the appearance of the polymers.

Each of the pressures was at a level lower than 10 kg.cm$^{-2}$.

EXAMPLES 12 and 13

Pre-polymerization

An autoclave of a 15-l capacity was charged with 5 l of NMP, heated to 120° C. and then charged with 1,866 g of sodium sulfide 2.8-hydrate. The mixture was slowly heated up to 205° C. over a period of about 2 hours with stirring, while distilling 411 g of water out the autoclave. It was found that the proportion of water remaining in the system was about 1.22 moles per mole of the sodium sulfide.

After cooling down to 140° C., the autoclave was charged with 2,090 g of DCB. The mixture was heated to 250° C. and allowed to polymerized for 3 hours so as to give a pre-polymerized slurry, referred to as "R-2" hereinafter, at a conversion of 99.8%. It was found that the resulting polymer had a melt viscosity of 310 poises.

Post-polymerization:

A 120.3 g portion of the slurry synthesized in the above pre-polymerization, R-2, was charged into an autoclave having a capacity of 0.5 l. The autoclave was charged with n-decane in such a proportion that the n-decane comprised 44% by weight of the total of solvents. The mixture was subjected to post-polymerization at a reaction temperature of 250° C. for 5 hours (Example 12) or 7 hours (Example 13).

In the both cases, the polymers showed increased melt viscosities, respectively.

Each of the pressures was at a level of lower than 10 kg.cm$^{-2}$.

EXAMPLES 14–16

An autoclave of a 0.5-l capacity was charged with 120.3 g of R-1 or R-2 slurry and p-cymene was added in a proportion varying from 32% to about 55% by weight of the total of solvents present. The mixture was subjected to post-polymerization at a reaction temperature of 250° C. or 265° C. for a period of 5 hours. Though each of the polymers was not obtained in the particle form, the polymers showed melt viscosities greater than 1,000 poises. The pressure in each of the cases was lower than 10 kg.cm$^{-2}$.

EXAMPLES 17–22

An autoclave of a 0.5-l capacity was charged with 120.3 g of R-1 or R-2 slurry and then a poor solvent mesitylene, cumene, n-tetradecane, methyl sulfone or kerosine was added. The mixture was subjected to post-polymerization under the conditions summarized in Table 1.

Each of the product polymers had an increased melt viscosity. The reaction pressure was lower than 10 kg.cm$^{-2}$ in each of the cases.

COMPARATIVE EXAMPLES 1 and 2

A 0.5-l autoclave was charged with 120.3 g of R-2 slurry and, then, n-decane was added to a level of 25% or 10% by weight of the total of solvents present.

The mixture was subjected to polymerization under the conditions shown in Table 2.

One of the thus treated polymers had an undesirably low melt viscosity and the other was decomposed when subjected to polymerization under the conditions shown in Table 2.

COMPARATIVE EXAMPLE 3

A 0.5-l autoclave was charged with 120.3 g of R-2 slurry and, then, n-decane was added to a level of 75% by weight of the total of solvents present. The mixture was polymerized under the conditions given in Table 2.

After the polymerization, the polymer was recovered in granular form, but showed a melt viscosity as low as 840 poises. The employed pressure was as high as 10 kg.cm$^{-2}$.

COMPARATIVE EXAMPLE 4

A 0.5-l autoclave was charged with 120.3 g of slurry R-1 and, then, n-decane was added to a level of 47.9% by weight of the total of solvents present. The mixture was heated to 250° C., but when this temperature had been achieved, the reaction was instantly stopped. The recovered polymer was in granular form, but showed a melt viscosity as low as 730 poises.

COMPARATIVE EXAMPLE 5

A 0.5-l autoclave was charged with 110 ml of NMP and 79.28 g of sodium sulfide tetrahydrate and slowly heated up to 205° C. with stirring over a period of about 2 hours, while distilling 32.3 g of water out the autoclave. It was found that the proportion of water remaining in the reaction system was about 1.08 moles per mole of the sodium sulfide.

After cooling down to 140° C., 66.2 g of DCB and 40 ml of NMP were added and n-decane was also added to a level of 47.9% by weight of the total of solvents present. The mixture was raised to 225° C. and held at this temperature for 2 hours, and subsequently raised to 250° C. and held for a further 3 hours before stopping the polymerization.

The recovered polymer had a low level of melt viscosity as 35 poises.

TABLE 1

| Example | Poor solvent | Added (wt. %) | Polymerization time (hrs.) | Temperature (°C.) | Pressure (kg · cm$^{-2}$) | Melt viscosity (poises) | Slurry used |
|---|---|---|---|---|---|---|---|
| 2 | n-decane | 32 | 5 | 250 | 6.2 | 2620 | R-1 |
| 3 | " | 34.3 | 5 | " | 6.0 | 3700 | " |
| 4 | " | 43.8 | 5 | " | 5.8 | 5020 | " |
| 5 | " | 47.9 | 5 | " | 6.0 | 5900 | " |
| 6 | " | 51.5 | 5 | " | 7.0 | 5800 | " |
| 7 | " | 44 | 3 | " | 6.0 | 4400 | " |
| 8 | " | 44 | 5 | " | 6.0 | 5200 | " |
| 9 | " | 44 | 8 | " | 5.8 | 4000 | " |
| 10 | " | 44 | 3 | 265 | 8.3 | 4730 | " |
| 11 | " | 44 | 5 | " | 8.5 | 3600 | " |
| 12 | " | 44 | 5 | 250 | 6.0 | 2900 | R-2 |
| 13 | " | 44 | 7 | " | 5.8 | 5300 | " |
| 14 | p-cymene | 32 | 5 | " | 6.0 | 1800 | " |
| 15 | " | 54.6 | 5 | " | 6.0 | 1920 | R-1 |
| 16 | " | 51.5 | 5 | 265 | 6.5 | 2140 | " |
| 17 | mesitylene | 54.9 | 5 | 250 | 6.0 | 1270 | R-2 |
| 18 | cumene | 54.9 | 5 | " | 7.0 | 1520 | " |
| 19 | n-tetradecane | 49.8 | 5 | " | 3.8 | 1500 | " |
| 20 | methylsulfone | 49.8 | 5 | " | 4.2 | 2160 | " |
| 21 | kerosine | 45 | 5 | " | 7.0 | 1510 | R-1 |
| 22 | " | 40 | 5 | " | 6.5 | 1500 | " |

TABLE 2

| Comparative Example | Poor solvent | Added (wt. %) | Polymerization time (hrs.) | Temperature (°C.) | Pressure (kg · cm$^{-2}$) | Melt viscosity (poises) | Slurry used |
|---|---|---|---|---|---|---|---|
| 1 | n-decane | 25 | 5 | 250 | 5.5 | 720 | R-2 |
| 2 | " | 10 | 5 | " | 5.5 | | " |
| 3 | " | 75 | 5 | " | 10 | 840 | " |
| 4 | " | 47.9 | 0 | " | 6.0 | 730 | R-1 |

From the foregoing, it is apparent that the present invention enables one to produce a polyarylene sulfide having an increased melt viscosity, indicative of an increased molecular weight. The polyarylene sulfide of increased molecular weight may be advantageously molded or shaped into various articles without suffering from difficulties experienced with the conventional polyarylene sulfide materials.

What is claimed is:

1. A process for preparing polyarylene sulfides by reacting a reaction mixture comprising an alkali metal sulfide and a dihaloaromatic compound in an organic amide solvent, characterized in that the process is conducted in at least the following two stages:

(A) a step wherein the process is carried out at a temperature of 180°-250° C. in the presence of 0.5-2.5 moles of water per mole of the alkali metal sulfide so as to produce a polyarylene sulfide having a melt viscosity of about 5-800 poises at a conversion of at least 50 mole % of the dihaloaromatic compound; and (B) a step wherein a poor solvent for the polyarylene sulfide is added to the reaction mixture to such an extent that the added poor solvent comprises 30-60% by weight of the total of the solvents present and the process is further continued at a temperature raised to the range of 250°-290° C., thereby to form an increased molecular weight polyarylene sulfide product showing a melt viscosity greater than about 1,000 poises as measured at a temperature of 300° C. and a shear rate of 200 sec$^{-1}$.

2. A process as claimed in claim 1 wherein water is present in a proportion of 1.0-1.5 moles per mole of the alkali metal sulfide in step (A).

3. A process as claimed in claim 1 wherein the dihaloaromatic compound is present in a proportion of 0.9-1.1 moles per mole of the alkali metal sulfide reactant.

4. A process as claimed in claim 1 wherein the dihaloaromatic compound is polymerized at a conversion of at least 98 mole % in step (A).

5. A process as claimed in claim 1 wherein a polymerization time in step (B) ranges from 0.5 to 20 hours.

6. A process as claimed in claim 1 wherein the poor solvent is selected from the group consisting of $C_8-C_{24}$ aromatic hydrocarbons and $C_6-C_{24}$ aliphatic hydrocarbons.

7. A process as claimed in claim 6 wherein the poor solvent is selected from the group consisting of n-decane, p-cymene, trimethoxy benzene, cumene, methyl sulfone, n-tetradecane, mesitylene and kerosine.

8. A process as claimed in claim 1 wherein step (B) is conducted until a melt viscosity of at least 2,000 poises is attained.

* * * * *